US008018233B2

(12) United States Patent
Iwanaga et al.

(10) Patent No.: US 8,018,233 B2
(45) Date of Patent: Sep. 13, 2011

(54) EVALUATION METHOD OF SEPARATOR FOR NONAQUEOUS ELECTROLYTE BATTERY, AND NONAQUEOUS ELECTROLYTE BATTERY

(75) Inventors: Masato Iwanaga, Moriguchi (JP); Noriko Yamashita, Moriguchi (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 564 days.

(21) Appl. No.: 12/145,664

(22) Filed: Jun. 25, 2008

(65) Prior Publication Data

US 2009/0261835 A1   Oct. 22, 2009

(30) Foreign Application Priority Data

Jun. 28, 2007   (JP) .................................. 2007-169861

(51) Int. Cl.
*G01N 27/416*   (2006.01)
(52) U.S. Cl. ............ 324/426; 29/700; 29/730; 429/233; 429/199; 429/164; 429/88; 429/90; 429/126; 429/231.95; 324/432; 324/444; 324/427; 205/335; 320/132; 320/134; 320/162
(58) Field of Classification Search ................... 29/700, 29/730, 700.73; 429/223, 199, 164, 88, 90, 429/126, 231.95, 123.95; 324/432, 444, 324/426, 427; 205/335; 320/132, 134, 162
See application file for complete search history.

(56) References Cited

U.S. PATENT DOCUMENTS

| 4,184,930 | A | * | 1/1980 | Appleby et al. ............... 205/188 |
| 5,422,197 | A | * | 6/1995 | Zito ............................... 429/51 |
| 5,488,300 | A | * | 1/1996 | Jamieson ...................... 324/432 |
| 5,641,591 | A | * | 6/1997 | Kawakami et al. ......... 429/231.5 |
| 5,800,939 | A | * | 9/1998 | Mishina et al. ................. 429/57 |
| 5,989,372 | A | * | 11/1999 | Momoda et al. ........... 156/89.11 |
| 6,339,334 | B1 | * | 1/2002 | Park et al. ..................... 324/425 |
| 6,489,783 | B1 | * | 12/2002 | Liu et al. ....................... 324/663 |
| 6,525,544 | B1 | * | 2/2003 | Okada ........................... 324/551 |
| 6,812,624 | B1 | * | 11/2004 | Pei et al. ....................... 310/309 |
| 6,967,499 | B1 | * | 11/2005 | Haase et al. .............. 324/762.03 |
| 7,468,575 | B2 | * | 12/2008 | Pelrine et al. ................. 310/363 |
| 7,579,859 | B2 | * | 8/2009 | Liao et al. ................ 324/762.09 |
| 2001/0019270 | A1 | * | 9/2001 | Onishi et al. .................. 324/426 |
| 2002/0182484 | A1 | * | 12/2002 | Segawa et al. .................. 429/94 |
| 2007/0108490 | A1 | * | 5/2007 | Tan et al. ...................... 257/296 |
| 2008/0278174 | A1 | * | 11/2008 | Li et al. ........................ 324/525 |

FOREIGN PATENT DOCUMENTS

| JP | 8-244152 A | 9/1996 |
| JP | 11-102683 A | 4/1999 |
| JP | 2002-279956 A | 9/2002 |

* cited by examiner

*Primary Examiner* — Huy Q Phan
*Assistant Examiner* — Lamarr Brown
(74) *Attorney, Agent, or Firm* — Westerman, Hattori, Daniels & Adrain, LLP

(57) ABSTRACT

The evaluation method of a separator for a nonaqueous electrolyte battery according to the present invention includes: placing opposite an upper jig 21 serving also as a conductive electrode and a lower jig 23 serving also as a conductive electrode in both sides of the separator sample 22; and measuring the relationship between an applied voltage and a passed current between the upper jig 21 and the lower jig 23 while applying a pressure to between the upper jig 21 and the lower jig 23 to evaluate the separator. At this time, by fitting a foreign material 28 in any shape between the separator sample 22 and one of the upper jig 21 and the lower jig 23, an evaluation of the separator simulating the presence of a foreign material affecting adversely the separator can be performed.

5 Claims, 4 Drawing Sheets

EVALUATION METHOD OF SEPARATOR FOR NONAQUEOUS ELECTROLYTE BATTERY, AND NONAQUEOUS ELECTROLYTE BATTERY

TECHNICAL FIELD

The present invention relates to an evaluation method of a separator for a nonaqueous electrolyte battery and a nonaqueous electrolyte battery. Further specifically, the invention relates to a novel evaluation method of a separator for a nonaqueous electrolyte battery, and a nonaqueous electrolyte battery using a separator of which reliability has been specified by the evaluation method.

BACKGROUND

Since a nonaqueous electrolyte battery such as a lithium primary battery and a lithium ion secondary battery is light and capable of obtaining a high voltage, and has a high energy density, it has been used in a wide range of fields. Here, an example of a nonaqueous electrolyte secondary battery among nonaqueous electrolyte batteries of related art is described referring to FIG. 4.

FIG. 4 is a perspective view showing a cylindrical nonaqueous electrolyte secondary battery produced conventionally by sectioning the battery longitudinally.

The nonaqueous electrolyte secondary battery 10 uses a wound electrode body 14 produced by winding a positive electrode 11 and a negative electrode 12 through a separator 13, and has such a constitution that: insulating plates 15 and 16 are disposed respectively on the top side and bottom side of the wound electrode body 14 to prepare a parts set; the parts set is held in the inside of a steel-made cylindrical battery outer can 17 serving also as a negative electrode terminal; a power collecting tab 12a of the negative electrode 12 is welded to an inside bottom of the battery outer can 17, and a power collecting tab 11a of the positive electrode 11 is welded to a bottom plate of a current-intercepting opening-sealing body 18 with a built-in safety device; a predetermined nonaqueous electrolyte is poured through an opening of the battery outer can 17; and the battery outer can 17 is sealed with the current-intercepting opening-sealing body 18 after pouring the nonaqueous electrolyte. Such a nonaqueous electrolyte secondary battery exhibits the excellent effects of, for example, high battery performance and battery reliability.

As a negative electrode active material used in the nonaqueous electrolyte secondary battery, carbonaceous materials such as graphite and amorphous carbon are widely used. On the other hand, as a positive electrode active material, a lithium-transition metal compound oxide represented by Formula: $Li_xMO_2$ (in which M represents at least one of Co, Ni and Mn) capable of reversibly intercalating and deintercalating lithium ion is used. Examples of the lithium-transition metal compound oxide include $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1) or $LiFePO_4$, and these compound oxides are used individually or in combination.

Further, as a solvent (organic solvent) of a nonaqueous electrolyte, carbonates, lactones, ethers and esters are used individually or in combination of two or more thereof. Among them, particularly carbonates having a large dielectric constant and having a large ion conductivity of the nonaqueous electrolyte thereof are frequently used. Here, as a solute of the nonaqueous electrolyte, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}C_{10}$, $Li_2B_{12}Cl_{12}$ or a mixture thereof is used.

Thus, in the nonaqueous electrolyte battery, a flammable organic solvent is used as a solvent of the electrolyte. Therefore, for avoiding a danger in a case where the temperature inside the battery is excessively elevated due to an internal short circuit etc. by an external short circuit, overcharge, improper connection, battery drop etc., normally in the nonaqueous electrolyte battery, a safety apparatus such as a safety valve, a PTC (Positive Temperature Coefficient) element, and a current controlling circuit is provided.

Further, a separator used in the nonaqueous electrolyte battery assumes the important function of "maintenance of electronic insulating properties" for preventing the internal short circuit of the battery. It is known that the separator has a large influence on the battery characteristics and safety. Namely, the separator must be able not only to prevent the short circuit in the positive and negative electrodes in an usual using condition of the nonaqueous electrolyte battery, but also to maintain the battery voltage even in a high-load condition thereof by suppressing the electric resistance to low by a porous structure thereof. In addition, the separator must have a shutdown function for suppressing an excessive temperature elevation of the battery by causing the separator to be substantially imperforated while maintaining the predetermined size of the length and width of the separator to enlarge the electric resistance and to terminate the battery reaction in the case where a large current has been passed through the nonaqueous electrolyte battery due to an internal short circuit etc. by an external short circuit, improper connection or battery drop etc., and the battery temperature has been elevated. Therefore, as a separator for the nonaqueous electrolyte battery according to related art, a fine porous film composed mainly of a polyethylene resin or a fine porous film composed mainly of a polypropylene resin has been frequently used (see JP-A-8-244152 and JP-A-2002-279956).

Thus, though the separator for the nonaqueous electrolyte battery has assumed an important function up until the present, there has been no unitary standard among the manufacturers for quantifying the property "maintenance of electronic insulating properties" necessary for the separator for nonaqueous electrolyte batteries and the evaluation of the separator for nonaqueous electrolyte batteries by measuring the appropriate physical properties is performed for every manufacturers. For example, in JP-A-11-102683, there is disclosed an invention of a method for evaluating a porous film by heating a porous film of a separator etc. using a heat sealer at 50 to 200° C. under a pressure of 0.1 to 50 kg/cm² for 0.1 to 60 seconds and by measuring an alternating current resistance of the film in an organic electrolyte using an ohm meter to calculate the electric resistance.

The above-described evaluation method of a porous film of related art includes: pressurizing and heating the porous film of a separator etc. at a certain temperature, under a certain pressure and for a certain time; cutting out a predetermined part from this pretreated porous film; fixing the predetermined part in an electric resistance measuring cell containing an organic electrolyte to measure the alternating current resistance thereof. This measuring method is performed for the purpose of measuring a thermal behavior of the separator and is not suitable for evaluating the quality and reliability with respect to the "maintenance of electronic insulating properties" of the separator under the circumstances in which the constituting pressure within the battery is varied due to the expansion and contraction of the electrode plate according to the charge and discharge. Because for measuring the relationship between the time for pressurizing or heating at various temperatures or under various pressures and the alternating current resistance, it is necessary to prepare porous films which have been subjected to several types of pretreatments in which the pressurizing time or the heating time is variously changed and to measure the alternating current resistances of these pretreated porous films respectively, there is the problem that the measurement takes much time. In addition, for measuring the alternating current resistance when both the heating temperature and the pressurizing pressure of the porous film are varied, even more pretreated porous film samples are required to be prepared and measured. Hence, it is apparent that the measurement inevitably takes a lot longer.

SUMMARY

An advantage of some aspects of the present invention is to provide a novel evaluation method of a separator for a nonaqueous electrolyte battery capable of measuring the separator sample as it is without subjecting the separator sample to a special treatment, at normal temperature and capable of quantifying the property "maintenance of electronic insulating properties" in a short time.

Further, an advantage of other aspects of the invention is to provide a nonaqueous electrolyte battery using a separator of which reliability has been specified by the above evaluation method of a separator for the nonaqueous electrolyte battery.

According to a first aspect of the present invention, an evaluation method of a separator for a nonaqueous electrolyte battery includes: placing opposite a pair of conductive electrodes respectively in both sides of the separator for a nonaqueous electrolyte battery; and measuring the relationship between an applied voltage and a passed current between the pair of conductive electrodes while applying a pressure to between the pair of conductive electrodes to evaluate the separator.

According to the evaluation method of a separator for a nonaqueous electrolyte battery of the invention, without performing any pretreatment of the separator, at normal temperature without the temperature control, only by measuring the relationship between an applied voltage and a passed current between the pair of conductive electrodes while applying a pressure to between the pair of conductive electrodes, the properties of the separator related to the "maintenance of electronic insulating properties" can be measured. Therefore, an apparatus for subjecting the separator to a heating pretreatment at a high temperature like in an example of related art is not required and moreover, with one measurement per one separator sample, necessary physical properties (pressure, voltage and current) can be obtained, so that the properties of the separator related to the "maintenance of electronic insulating properties" can be measured in a short time.

Moreover, according to the evaluation method of a separator for a nonaqueous electrolyte battery of the invention, since the pressure resistance and the voltage endurance (insulating properties) of the separator can be quantified, the evaluation method of the invention can be caused to be one method for developing the separator aiming at securing the reliability of the insulating properties under various pressures which can follow, for example the expansion and contraction of an electrode plate due to the charge and discharge within the nonaqueous electrolyte secondary battery. Further, the evaluation method of the invention can be applied to a method for preventing a battery failure caused conventionally during a battery assembly, a battery evaluation or a battery use on the market from occurring by a test result of the separator simple, or to a method for selecting the separator for producing a battery having higher reliability. Here, the evaluation method of a separator for a nonaqueous electrolyte battery of the invention is useful not only as the evaluation method for a separator for a nonaqueous electrolyte secondary battery, but also as the evaluation method of a separator for a nonaqueous electrolyte primary battery.

In the evaluation method of a separator for a nonaqueous electrolyte battery according to a second aspect of the invention, it is preferred that at least one of the pressure and voltage applied to the pair of conductive electrodes is varied.

By the evaluation method of a separator for a nonaqueous electrolyte battery according to the above aspect, since it is easy to vary continuously any one of the pressure and voltage applied to the pair of conductive electrodes, a value of the passed current when the pressure is continuously varied under a constant voltage or a value of the passed current when the voltage is continuously varied under a constant pressure can be measured, so that the properties of the separator related to the "maintenance of electronic insulating properties" can be measured in a short time. Here, the varying of the applied pressure or applied voltage may be manually or automatically performed.

In the evaluation method of a separator for a nonaqueous electrolyte battery according to a third aspect of the invention, it is possible that the separator is evaluated by applying a constant voltage to between the pair of conductive electrodes and by increasing the pressure applied to between the pair of conductive electrodes to measure the pressure when between the pair of conductive electrodes has led to a dielectric breakdown.

By the evaluation method of a separator for a nonaqueous electrolyte battery according to the above aspect, by increasing continuously the pressure applied to between the pair of conductive electrodes while applying a constant voltage to between the pair of conductive electrodes to measure the pressure when between the pair of conductive electrodes a dielectric breakdown has been caused, the properties of the separator related to the "maintenance of electronic insulating properties" can be measured. Namely, when the applied voltage is fixed beforehand, it may be only with the measurement of the pressure when between the pair of conductive electrodes a dielectric breakdown has been caused, so that the properties of the separator related to the "maintenance of electronic insulating properties" can be measured with advantageous reproducibility.

In the evaluation method of a separator for a nonaqueous electrolyte battery according to a fourth aspect of the invention, it is possible that the separator is evaluated by applying a constant pressure to between the pair of conductive electrodes and by increasing the voltage applied to between the pair of conductive electrodes to measure the voltage when between the pair of conductive electrodes a dielectric breakdown has been caused.

By the evaluation method of a separator for a nonaqueous electrolyte battery according to the above aspect, while applying a constant pressure to between the pair of conductive electrodes, by increasing continuously the voltage applied to between the pair of conductive electrodes to measure the voltage when between the pair of conductive electrodes a dielectric breakdown has been caused, the properties of the separator related to the "maintenance of electronic insulating properties" can be measured. Namely, when the applied pressure is beforehand fixed, it may be only with the measurement of the voltage when between the pair of conductive electrodes a dielectric breakdown has been caused, so that the properties of the separator related to the "maintenance of electronic insulating properties" can be measured with advantageous reproducibility.

In the evaluation method of a separator for a nonaqueous electrolyte battery according to a fifth aspect of the invention, it is possible that the separator is evaluated by fitting a foreign material in any shape between any one of the pair of conductive electrodes and the separator.

By the evaluation method of a separator for a nonaqueous electrolyte battery according to the above aspect, since between any one of the pair of conductive electrodes and the separator, there is fitted a foreign material in any shape produced by simulating a beforehand assumed matter such as positive electrode active material mixture particles, negative electrode active material mixture particles, or a metal-made dust for example, an electrode substrate and a battery outer can, the properties of the separator related to the "maintenance of electronic insulating properties" can be measured simulating the presence of a foreign material adversely affecting the separator.

In the evaluation method of a separator for a nonaqueous electrolyte battery according to a sixth aspect of the invention, it is preferred that as the pair of conductive electrodes, a pair of conductive electrodes in which the opposite surfaces of the electrodes are parallel to each other and each thereof is a planar surface, are used.

In the nonaqueous electrolyte battery in a stationary state, a pressure is applied to the separator from both sides thereof. Therefore, by the evaluation method of a separator for a nonaqueous electrolyte battery according to the above aspect, the properties of the separator related to the "maintenance of electronic insulating properties" can be measured simulating a nonaqueous electrolyte battery in a normal state.

In the evaluation method of a separator for a nonaqueous electrolyte battery according to a seventh aspect of the invention, it is preferred that as one of the pair of conductive electrodes, a conductive electrode having a surface area larger than that of the opposite surface of the partner electrode and is composed of a member placed on a supporting base and having a planar surface, is used.

By the evaluation method of a separator for a nonaqueous electrolyte battery according to the above aspect, since one of the pair of conductive electrodes has a surface area larger than that of the opposite surface of the partner electrode and moreover, is composed of a member placed on a supporting base and having a planar surface, the measurement may be performed only by placing the separator on the one of the pair of conductive electrodes and by allocating the partner electrode on the separator, so that a predetermined measurement can be easily performed.

In the evaluation method of a separator for a nonaqueous electrolyte battery according to an eighth aspect of the invention, it is preferred that as a means for applying the pressure to between the pair of conductive electrodes, a compression testing machine is used.

The compression testing machine is a known apparatus capable of applying the pressure to a sample while varying continuously the pressure and various types thereof are commercially available. Accordingly, by the evaluation method of a separator for a nonaqueous electrolyte battery according to the above aspect, the properties of the separator related to the "maintenance of electronic insulating properties" can be inexpensively measured.

According to a ninth aspect of the invention, a nonaqueous electrolyte battery uses a separator of which reliability has been specified by the evaluation method of a separator for a nonaqueous electrolyte battery according to the above aspects of the invention.

Since the nonaqueous electrolyte battery according to the above aspect is a nonaqueous electrolyte battery having a separator of which reliability has been specified by the evaluation method of a separator for a nonaqueous electrolyte battery according to the invention, it can be marketed as a nonaqueous electrolyte battery having high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the best mode for carrying out the present invention is specifically described referring to various embodiments, comparative examples and the accompanying drawings. However, the following embodiments only show examples of the nonaqueous electrolyte secondary battery for embodying the technical concept of the invention and it is not intended to specify the invention to these embodiments. Therefore, the invention can be applied equally also to the modifications in which various modifications have been performed to the invention without departing from the technical concept of the invention shown in claims.

Figure 1:
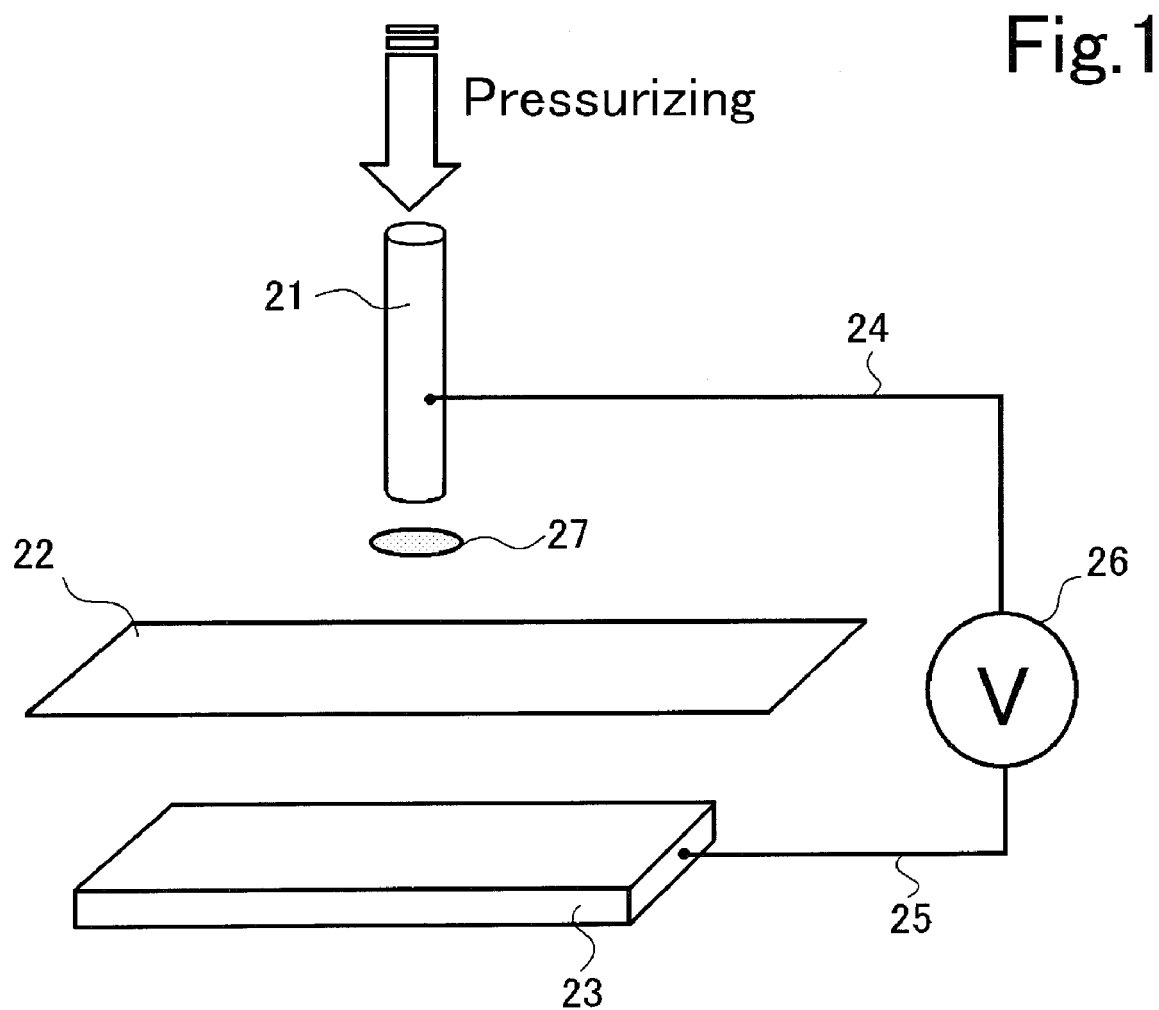
FIG. 1 is a view schematically showing an evaluation method of a separator for a nonaqueous electrolyte battery according to the first embodiment.
Figure 2:
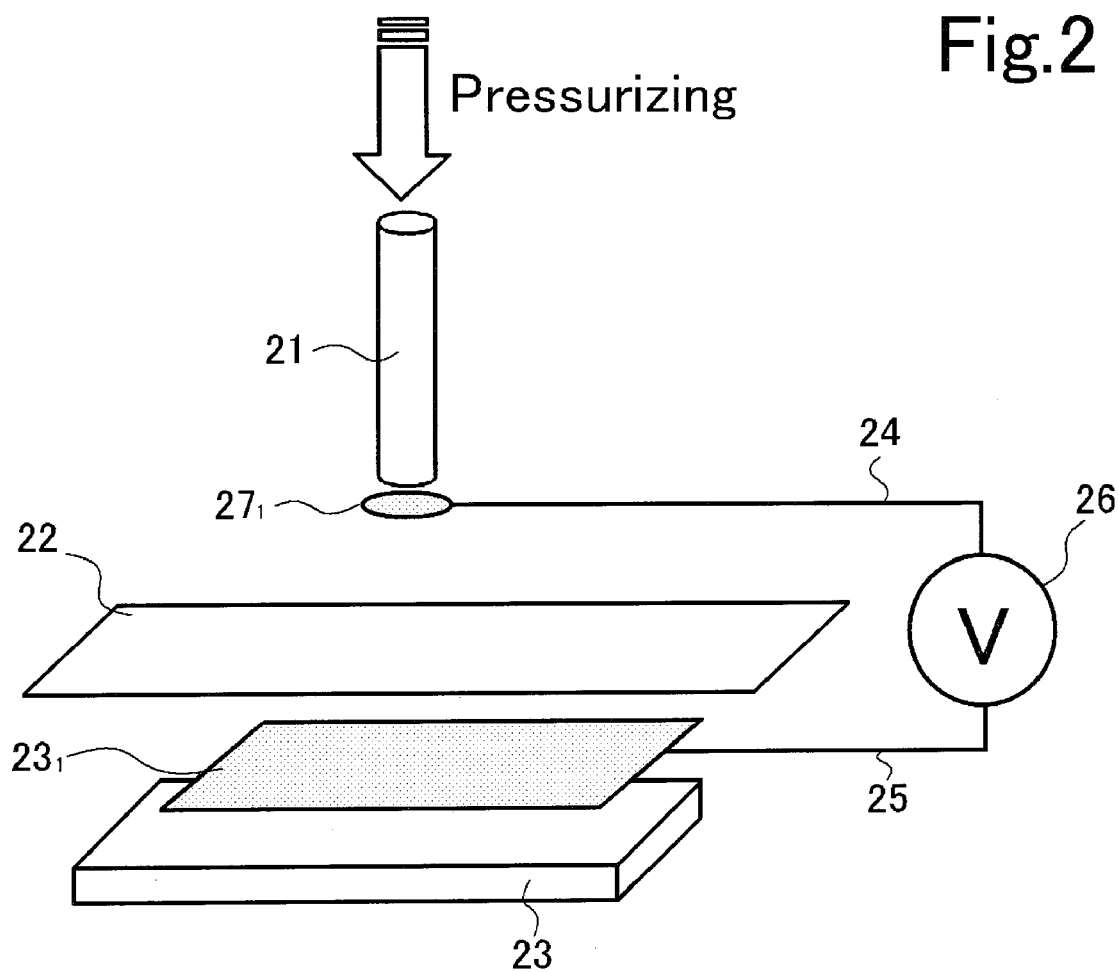
FIG. 2 is a view schematically showing a modified example of the evaluation method of a separator for a nonaqueous electrolyte battery according to the first embodiment.
Figure 3:
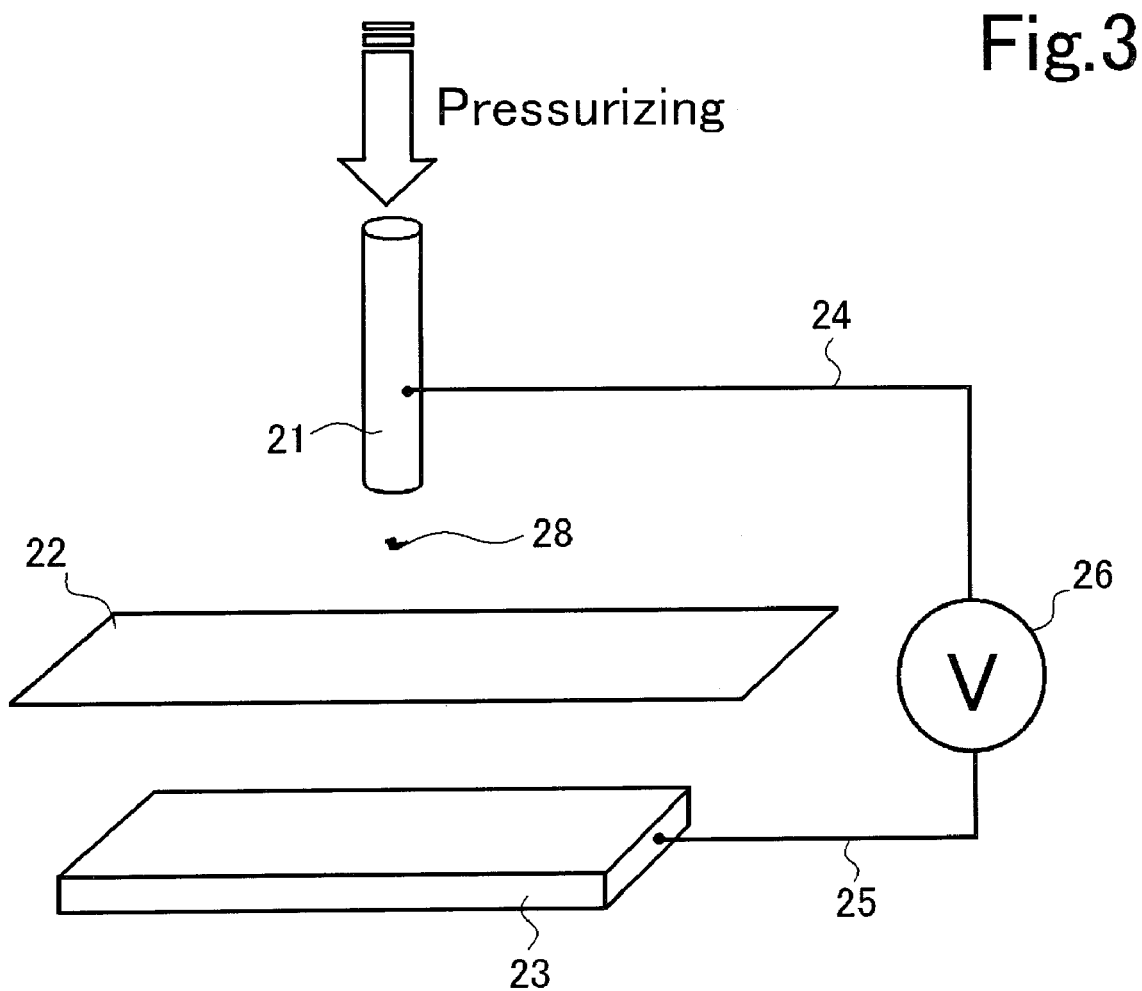
FIG. 3 is a view schematically showing the evaluation method of a separator for a nonaqueous electrolyte battery according to the second embodiment.
Figure 4:
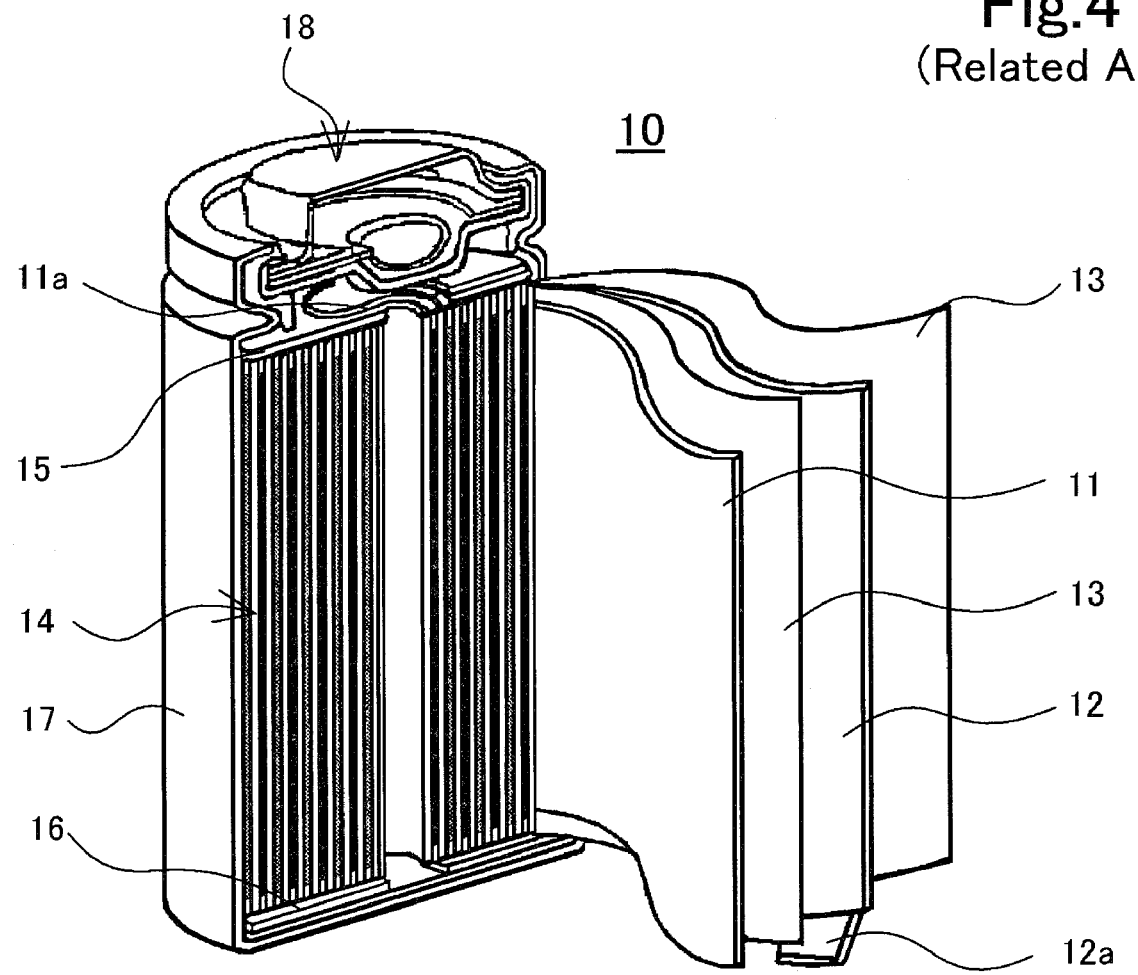
FIG. 4 is a perspective view schematically showing a cylindrical nonaqueous electrolyte secondary battery produced conventionally by sectioning the battery in the lengthwise direction.

Here, FIG. 1 is a view schematically showing the evaluation method of a separator for a nonaqueous electrolyte battery according to the first embodiment. FIG. 2 is a view schematically showing a modified example of the evaluation method of a separator for a nonaqueous electrolyte battery according to the first embodiment. FIG. 3 is a view schematically showing the evaluation method of a separator for a nonaqueous electrolyte battery according to the second embodiment.

First, the production method of a wound electrode body and a nonaqueous electrolyte secondary battery used in the first to third comparative examples, is described.

Preparation of Positive Electrode

The positive electrode plate was produced as follows. First, a lithium cobalt oxide ($LiCoO_2$) powder as a positive electrode active material, acetylene black and a poly(vinylidene fluoride) (PVDF) powder as positive electrode conductive agents in a mass ratio of positive electrode active material: acetylene black:PVDF=94:3:3 were charged into N-methyl-2-pyrrolidone (NMP) and kneaded to prepare a slurry. The slurry was applied to both surfaces of a positive electrode power collecting body made of aluminum foil and having a thickness of 15 μm by a doctor blade method, and then dried to form a positive electrode active material layer on both surfaces of the positive electrode power collecting body. Thereafter, the positive electrode power collecting body was compressed using a compression roller to prepare a positive electrode.

Preparation of Negative Electrode

A dispersion of a graphite powder as a negative electrode active material and a styrene-butadiene rubber (SBR) (styrene:butadiene=1:1) was dispersed in water and thereto, further carboxymethyl cellulose (CMC) as a thickening agent was added to prepare a negative electrode active material mixture slurry. Here, the negative electrode active material mixture slurry was prepared so that the dried mass ratio of graphite:SBR:CMC became 95:3:2. The negative electrode active material mixture slurry was applied to both surfaces of a negative electrode power collecting body made of a copper foil and having a thickness of 8 μm by a doctor blade method to form an active material mixture. The negative electrode power collecting body was dried and then compressed using a compression roller to prepare a negative electrode.

Preparation of Electrolyte

In a mixed solvent composed of ethylene carbonate (EC), dimethyl carbonate (DMC) and propylene carbonate (PC) (in mass ratio of EC:DMC:PC=30:65:5), 1 mol/L of $LiPF_6$ was dissolved to prepare an organic electrolyte and to the electrolyte, 2% by weight of vinylene carbonate was added to prepare a nonaqueous electrolyte.

Preparation of Wound Electrode Body and Battery

Using the above positive electrode and negative electrode, by winding both electrodes between which the separator was interposed with a wiring, a wound electrode body was prepared to be subjected to the test of the first comparative example. Further separately, after the wound electrode body was inserted into a cylindrical outer can, the above electrolyte liquid was poured thereinto and by sealing an opening of the outer can with a current-intercepting opening-sealing body, a nonaqueous electrolyte secondary battery having a diameter of 18 mm and a height of 65 mm was prepared. Here, the designed capacity of the nonaqueous electrolyte secondary battery was 2.6 Ah at the charging voltage of 4.2 V. Further, the obtained nonaqueous electrolyte secondary battery was fully-charged, taken apart and subjected to the test of the third comparative example.

FIRST EMBODIMENT AND FIRST COMPARATIVE EXAMPLE

In the first embodiment and the first comparative example, the effectiveness of the evaluation method of a separator for a nonaqueous electrolyte battery according to the invention was confirmed. Here, as the compression testing machine, a tensile and compression testing machine (trade name: SV-52NA; manufactured by Imada Seisakusho Co., Ltd.) was used and as the voltage resistance tester, a voltage resistance tester (trade name: TOS5052; manufactured by Kikusui Electronics Corporation) was used.

In the First Embodiment, as shown in FIG. 1, as an upper jig 21 of the compression testing machine (not shown in Figs.), a stainless steel-made cylinder having a diameter of 6 mm was used and as a lower jig 23 for fixing the separator sample 22, a stainless steel-made plate base was used. Between both jigs 21, 23 is electrically insulated and for causing both jigs 21, 23 respectively to serve also as electrodes, to them respectively lead wires 24, 25 for applying the voltage were connected. Next, a voltage resistance tester 26 was connected to a terminal of the lead wire 24 and to a terminal of the lead wire 25 for applying a predetermined voltage to the terminals of the lead wires 24, 25 from the voltage resistance tester 26.

A predetermined separator sample 22 as a sample to be measured was placed on the lower jig 23 with preventing the cause of a crinkling or crease on the sample and an aluminum foil 27 having a diameter of 6.2 mm slightly larger than that of the upper jig 21 was fitted between the bottom surface of the cylindrical upper jig 21 and the separator sample 22 so as to be interposed therebetween. Next, the upper jig 21 was let down and when a predetermined pressure (7 N/φ 6 mm=0.25 $N/mm^2$ and 50 N/φ 6 mm=1.77 $N/mm^2$) was applied thereto, the applied voltage was elevated at an elevating rate of 100 V/4 sec by the voltage resistance tester to measure the voltage of the instant at which a criterion current of 10 mA was passed as the liminal voltage resistance.

With respect to each 30 samples of the separator samples 1 to 3 made of different materials each other, the liminal voltage resistance values when the predetermined pressure was applied thereto were measured and the results thereof are shown in the following Table 1. Here, the values in Table 1 are average values for 30 samples and the values in the parenthesis represent from the minimum value to the maximum value.

Further, in the first comparative example, using each of the separator samples 1 to 3, respectively 100 pieces of the wound electrode body were prepared as described above and to each thereof, a voltage of 500 V was applied between the positive and negative electrode tabs to evaluate a piece in which a current of 10 mA or more was passed as a defective piece and to count the number of the defective pieces. The measurement results are summarized in Table 1.

TABLE 1

| | First Embodiment (liminal voltage resistance) | | First Comparative Example (Wound electrode body voltage resistance test)* |
|---|---|---|---|
| | Pressure = 0.25 $N/mm^2$ (N = 30) | Pressure = 1.77 $N/mm^2$ (N = 30) | |
| Separator sample 1 | 1140 V (1050-1280 V) | 1250 V (700-1520 V) | 0/100 |
| Separator sample 2 | 1030 V (210-1360 V) | — | 7/100 |
| Separator sample 3 | 1530 V (1010-1900 V) | 1360 V (360-1790 V) | 2/100 |

*number of defective pieces/number of all measured pieces

From the result of the first embodiment shown in Table 1, the following is apparent. In the case of the separator sample 1, both for the applied pressure of 0.25 $N/mm^2$ and for the applied pressure of 1.77 $N/mm^2$, there was not so large a difference in the liminal voltage resistance value and the fluctuation thereof. However, in the case of the separator sample 2, even for the applied pressure of 0.25 $N/mm^2$, there was seen a piece having an extremely low liminal voltage resistance of 210 V and moreover, the fluctuation thereof was as large as from 210 to 360 V. For the applied pressure of 1.77 $N/mm^2$, all pieces short circuited, so that the liminal voltage resistance value could not be measured. Further, in the case of the separator sample 3, while for the applied pressure of 0.25 $N/mm^2$, the liminal voltage resistance value was large and the fluctuation thereof was small, for the applied pressure of 1.77 $N/mm^2$, the fluctuation of the liminal voltage resistance value became extremely large at 360 to 1,790 V.

On the other hand, from the measuring result of the first comparative example in which the voltage resistance test of the wound electrode body was performed, the following is apparent. In the case of the separator sample 1, the extremely advantageous result was obtained that the number of pieces which had voltage resistance failure was 0 pieces among the tested 100 pieces. Further, in the case of the separator sample 2, the number of voltage resistance failure pieces was as large as 7 among the 100 pieces and in the case of the separator sample 3, the number of the voltage resistance failure pieces was 2 among the 100 pieces.

Thus, as is apparent from the comparison of the result of the first embodiment shown in Table 1 with the result of the first comparative example, there can be recognized a fine correlative relationship between the result of evaluating the separator according to the first embodiment and the result of measuring the voltage resistance of the wound electrode body according to the first comparative example. Accordingly, it is apparent that the evaluation method of a separator according to the first embodiment is effective for the reliability of the battery.

Here, in the above first embodiment, there is shown an example in which the upper and lower jigs 21, 23 were used as serving also as the electrodes respectively. However, when the measurement is performed by arranging separately the electrodes in both sides of the separator respectively as others than the jigs, the same effect can be attained. This modified example is described referring to FIG. 2.

In this modified example, as the upper electrode, for example an aluminum foil $27_1$ having a diameter of 6.2 mm is fitted between the upper jig 21 and the separator sample 22 and as the lower electrode, an aluminum plate $23_1$ is fitted between the lower jig 23 and the separator sample 22. Next, the aluminum foil $27_1$ as the upper electrode and the aluminum plate $23_1$ as the lower electrode are connected to the voltage resistance tester 26 respectively through the lead wires 24, 25. In such a modified example, as the upper and lower jigs 21, 23, for example an insulating material such as ceramics can be used, so that the electrical insulating properties between the aluminum foil $27_1$ as the upper electrode and the aluminum plate $23_1$ as the lower electrode can be easily maintained.

SECOND EMBODIMENT, SECOND AND THIRD COMPARATIVE EXAMPLES

In the second embodiment, second and third comparative examples, by simulating the case where positive electrode active material mixture particles, negative electrode active material mixture particles, or a dust made of metal etc., for example, an electrode substrate and a battery outer can has invaded into between the separator and the positive or negative electrode, the properties related to the "maintenance of electronic insulating properties" of the separator sample were measured. Here, the compression testing machine and voltage resistance tester used in the second embodiment was the same as that used in the first embodiment and further, for the measurement of the sticking strength in the second comparative example, the compression testing machine used in the first embodiment was used.

In the second embodiment, as shown in FIG. 3, a stainless steel-made cylinder having a diameter of 6 mm was used as the upper jig 21 of the compression testing machine (not shown in Figs.) and a stainless steel-made plate base was used as the lower jig 23 for fixing the separator sample 22. Between both jigs 21, 23 was electrically insulated and for causing both jigs 21, 23 respectively to serve also as electrodes, to them respectively lead wires 24, 25 for applying the voltage were connected. Next, a voltage resistance tester 26 was connected to a terminal of the lead wire 24 and to a terminal of the lead wire 25 for applying a predetermined voltage to the terminals of the lead wires 24, 25 from the voltage resistance tester 26.

A predetermined separator sample 22 as a measuring sample was placed on the lower jig 23 with preventing the cause of a crinkling or crease on the sample and an Ni-made L-shaped foreign material 28 (height: 200 µm, width: 100 µm, length: 2 mm) was fitted as the foreign material between the bottom surface of the cylindrical upper jig 21 and the separator sample 22 so as to be interposed therebetween. Next, a voltage of 50 V was applied to between the upper and lower jigs 21, 23, and while letting down the upper jig 21 at a rate of 0.01 mm/sec to compress the separator sample 22, the pressure of the instant at which a criterion current of 10 mA was passed by the voltage resistance tester was measured as the insulating strength.

With respect to each 10 samples of the separator samples 4 and 5 having different materials, the insulating strength was measured and the results thereof are shown in the following Table 2. Here, the values of the second embodiment in Table 2 are average values for 10 samples and the values in the parenthesis represent from the minimum value to the maximum value.

Further, in the second comparative example, each 10 samples of the separator samples 4 and 5 was stack using a needle having a diameter of 1 mm and having a hemisphere-shaped tip at a sticking rate of 2 mm/sec to measure a maximum strength until the film is led to be broken as the sticking strength. The measurement results are summarized in Table 2. Here, the values of the second comparative example in Table 2 are average values for 10 samples and the values in the parenthesis represent from the minimum value to the maximum value.

Further in the third comparative example, the measurement was performed according to the test method of "Forced inside short circuit test" described in "Guide for safe use of lithium ion secondary battery in note-book type PC" published by the Japan Electronics and Information Technology Industries Association and the Battery Association of Japan. Namely, first, using the separator samples 4 and 5, respectively 10 pieces of the cylindrical nonaqueous electrolyte secondary battery were prepared as described above and the batteries were full-charged. The wound electrode body was taken out of the battery and the same foreign material as that used in the Second Embodiment was fitted between the positive electrode active material mixture and the separator inside the wound electrode body. Next, into a position corresponding to the position into which the foreign material of the wound electrode body was inserted, a stainless steel-made prismatic body having a cross section of a 10 mm×10 mm square as the upper jig was inserted and even when the voltage lowering between the positive and negative electrodes was detected during the insertion of the jig, the insertion was further continued. Then, the pressurizing was performed until the pressure became 100 N/100 mm² (1 N/mm²) and the presence or absence of the ignition was confirmed. The measuring results are summarized in Table 2.

TABLE 2

|  | Second Embodiment Insulating strength (N = 10) | Second Comparative Example Sticking strength (N = 10) | Third Comparative Example Forced inside short circuit test |
|---|---|---|---|
| Separator sample 4 | 0.81 N/mm² (0.74-0.92 N/mm²) | 250 g (230-260 g) | 0/5 (no ignition) |
| Separator sample 5 | 0.92 N/mm² (0.32-1.03 N/mm²) | 400 g (380-410 g) | 2/5 (ignition caused) |

From the results shown in Table 2, the following is apparent. In the case of the separator sample 4, the average value of the insulating strength was 0.81 N/mm² and the fluctuation thereof was such a small value as 0.74 to 0.92 N/mm². Further, the average value of the sticking strength of the separator sample 4 was 250 g and the fluctuation thereof was such a small value as 230 to 260 g. Moreover, the result of the inside short circuit test performed by preparing a nonaqueous electrolyte secondary battery using the separator sample 4 was that all 5 pieces among the tested 5 pieces have not ignited.

On the other hand, in the case of the separator sample 5, the average value of the insulating strength was 0.92 N/mm$^2$ which was larger than the average value of the separator sample 4, however, the fluctuation thereof was so extremely large as 0.32 to 1.03 N/mm$^2$. Further, the average value of the sticking strength of the separator sample 5 was as a large value as 400 g and moreover, the fluctuation thereof was so extremely small as 380 g to 410 g, so that the separator sample 5 had properties more advantageous than those of the separator sample 4. However, the result of the inside short circuit test performed by preparing a nonaqueous electrolyte secondary battery using the separator sample 5 was that 2 pieces among the tested 5 pieces ignited.

Thus, in the case of the separator sample 5, it was confirmed in the conventional sticking strength measurement that the separator sample 5 had extremely excellent properties. However, since according to the evaluation method of the Second Embodiment, though the average value of the insulating strength thereof was large, the fluctuation thereof was also large, so that there were pieces having a small insulating strength as the result and it was indicated that there is such a probability that the ignition shall be caused in the forced inside short circuit test.

Accordingly, it is apparent that the nonaqueous electrolyte battery prepared using a separator evaluated as advantageous by the evaluation method of a separator for a nonaqueous electrolyte battery according to the invention is evaluated as advantageous in the voltage resistance test of the wound electrode body, and can be expected to cause hardly the ignition in the forced inside short circuit test.

What is claimed is:

1. An evaluation method of a separator for a nonaqueous electrolyte battery, the method comprising:
    placing a pair of conductive electrodes on opposite sides of the separator; and
    measuring the relationship between an applied voltage and a passed current between the pair of conductive electrodes while applying a pressure to the pair of conductive electrodes,
    wherein the separator is evaluated by either
        (i) applying a constant voltage to the pair of conductive electrodes and increasing the pressure applied to the pair of conductive electrodes to measure the pressure when a dielectric breakdown between the pair of conductive electrodes has been caused, or
        (ii) applying a constant pressure to the pair of conductive electrodes and increasing the voltage applied to the pair of conductive electrodes to measure the voltage when a dielectric breakdown between the pair of conductive electrodes has been caused.

2. The evaluation method of a separator for a nonaqueous electrolyte battery according to claim 1, wherein a foreign material with a predetermined shape is fitted between any one of the pair of conductive electrodes and the separator.

3. The evaluation method of a separator for a nonaqueous electrolyte battery according to claim 1, wherein the pair of conductive electrodes have planar surfaces facing each other in parallel.

4. The evaluation method of a separator for a nonaqueous electrolyte battery according to claim 3,
    wherein a first one of the pair of conductive electrodes has a surface area larger than an area of the opposite surface of a second one of the pair of electrodes, the other electrode, and
    wherein the first one of the pair of conductive electrodes is composed of a planar surface member placed on a supporting base.

5. The evaluation method of a separator for a nonaqueous electrolyte battery according to claim 1, wherein a compression testing machine is used as a means for applying the pressure to the pair of conductive electrodes.

\* \* \* \* \*